United States Patent [19]

Parker

[11] Patent Number: 4,630,117

[45] Date of Patent: Dec. 16, 1986

[54] AUTOMATIC GAIN CONTROL SYSTEM

[75] Inventor: James S. Parker, Chesapeake, Va.

[73] Assignee: General Electric Company, Portsmouth, Va.

[21] Appl. No.: 739,358

[22] Filed: May 30, 1985

[51] Int. Cl.⁴ ............................................... H04N 5/52
[52] U.S. Cl. ..................................... 358/174; 358/177; 455/246
[58] Field of Search ........................ 358/174, 177, 179; 455/200, 246, 247, 250

[56] References Cited

U.S. PATENT DOCUMENTS

| | | | |
|---|---|---|---|
| 2,974,191 | 3/1961 | Cotsworth, III et al. | 358/174 X |
| 4,030,035 | 6/1977 | Ienaka et al. | 455/246 X |
| 4,148,068 | 4/1979 | Hofmann | 358/174 X |
| 4,370,520 | 1/1983 | Malchow | 455/246 X |
| 4,455,681 | 6/1984 | Wile | 455/246 X |

Primary Examiner—James J. Groody
Assistant Examiner—E. Anne Toth

[57] ABSTRACT

An automatic gain control system which measures the noise content of a received video signal and adjusts the gain of a radio frequency amplifier and a tuner to compensate for variations in noise levels. The apparatus uses a high frequency filter to strip the video information portion of a composite video signal to obtain only the noise component. The noise component is scaled and used in an automatic gain control feedback loop to control the gain of a radio frequency amplifier and a tuner. The system includes a standard AGC loop to regulate tuner gain for large amplitude signals to prevent overload.

6 Claims, 1 Drawing Figure

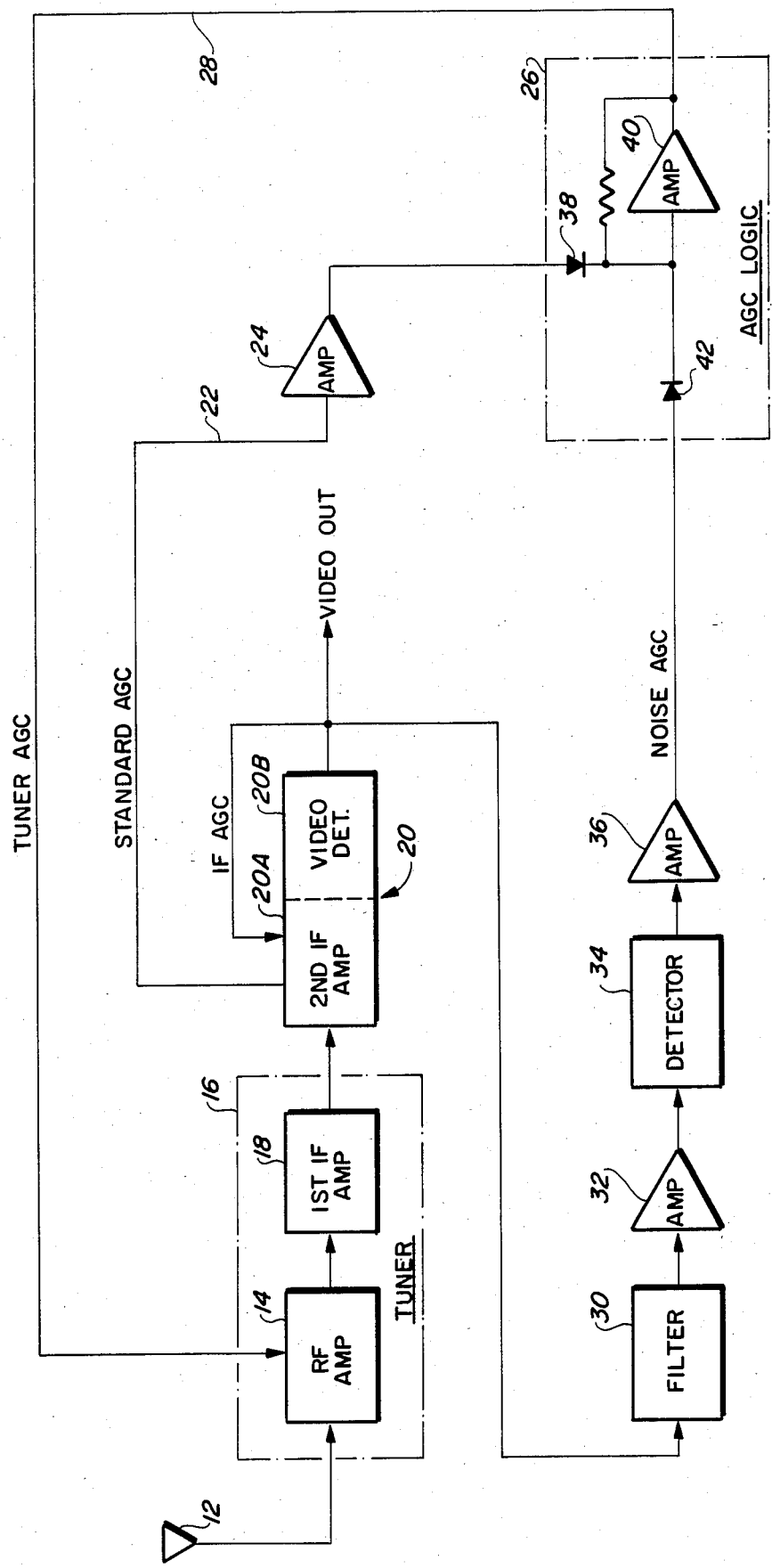

AUTOMATIC GAIN CONTROL SYSTEM

BACKGROUND OF THE INVENTION

The present invention relates to television receivers and, more particularly, to automatic gain control systems for such receivers.

Automatic gain control (AGC) circuits are well known in the art. A typical television receiver uses at least two AGC circuits in the tuner and associated intermediate frequency amplifiers in the front end of the receiver. One of the AGC circuits monitors the amplitude of the received video information signal and adjusts the gain of a radio frequency (RF) amplifier located in the tuner section. A second AGC circuit is associated with one of the intermediate frequency (IF) amplifiers which are connected to process the video information signal developed by the tuner. Generally, the AGC circuits are arranged such that a fixed gain is provided for low amplitude signals while stronger signals result in the activation of the AGC circuit to effectively reduce the gain of the amplifier. The first AGC circuit adjusts the gain of the RF amplifier in order to compensate for variations in the received signal level due to proximity of the transmitting station. The second AGC circuit is designed to assure that the amplitude of the video information signal is adjusted to a fixed value before being applied to the picture processing circuitry. For example, a typical arrangement adjusts the peak-to-peak amplitude of the synchronizing pulses associated with the received video signal to a predetermined value. The synchronizing pulses rather than the actual video information are sampled since the synchronizing pulses are presumed to be at a constant value. By adjusting the synchronizing pulses to the correct amplitude, the amplitude of the video information signal will necessarily follow.

One of the problems in the prior art systems is that the noise content of the video information signal also varies but not necessarily in correspondence with the video information content of a received signal. Accordingly, the signal to noise ratio in any AGC regulated video information signal may vary to such an extent that degradation of picture quality occurs even though the amplitude of the video signal is properly adjusted. Various proposals have been made to compensate for adverse signal to noise ratios in television receivers. U.S. Pat. No. 4,376,952 for example, discusses the prior art practice of depeaking a received signal by slight de-tuning of the receiver circuits. Such de-tuning is known to improve signal to noise ratio. However, such de-tuning also causes deterioration of the received video information in a received signal.

It is an object of the present invention to provide an improved automatic gain control system.

It is a further object of the present invention to provide an automatic gain control system which compensates for adverse signal to noise ratio signals.

SUMMARY OF THE INVENTION

The present invention provides an automatic gain control system which monitors the noise content of a received video signal and adjusts the gain of a radio frequency amplifier in a tuner to compensate for any increase in noise levels. The improved system is implemented by sampling the video output signal developed by the second IF amplifier which is maintained at a constant amplitude by the IF/AGC loop. The sampling system strips the video signal leaving only the noise component. Since the amplitude of the video signal at the output of the video detector is maintained constant, the amplitude of the noise signal is thus representative of the signal to noise ratio of the system. In a preferred embodiment, both the standard AGC system using the IF signal at the tuner and the noise amplitude signal are used to control the RF amplifier gain. The functions are implemented by a decision logic circuit which monitors both the amplitude of the IF signal developed by the RF amplifier and the amplitude of the noise signal and utilizes the largest of these two signals to control the gain of the RF amplifier.

For a better understanding of the present invention, reference may be had to the accompanying drawing taken in conjunction with the following detailed description.

DETAILED DESCRIPTION OF THE PREFERRED EMBODIMENT

Referring now to the drawing, there is shown a front end portion of a television receiver incorporating the teachings of the present invention. An antenna 12 adapted to receive a television signal is connected to supply the signal to an input terminal of a radio frequency (RF) amplifier 14 forming part of a tuner assembly 16. The tuner assembly 16 further includes a first intermediate frequency (IF) amplifier 18. Both the RF amplifier 14 and the IF amplifier 18 are of a type well known in the art. Although not shown as a separate block, there is also an oscillator and converter located within the tuner 16 which mixes the RF signal in a conventional manner with the signal from a local oscillator to develop the intermediate frequency television signal. The RF amplifier 14 is also of a typical gain control type having a second input terminal for receiving a feedback voltage signal for the purpose of adjusting the gain of the amplifier. The amplified IF signal developed by the amplifier 18 is coupled to a second IF amplifier stage 20 also of a type well known in the art which preferably includes a tuned circuit input to provide shaping of the desired IF pass band. The second IF amplifier stage 20 which includes a variable gain tuned amplifier 20A and a video detector 20B, typically includes a closed automatic gain control (AGC) circuit (indicated as IF AGC) which monitors the amplitude of the video output signal developed by the amplifier 20 and provides a feedback signal within the amplifier stage 20 to control its gain such that the amplitude of the video output signal is maintained at a predetermined peak to peak voltage, e.g., two volts. Although not shown in this drawing, the AGC circuit typically is a gated AGC circuit synchronized with the horizontal synchronizing signals forming a part of the received video signal. The purpose of synchronizing the signal to the horizontal synchronizing pulses is to assure that the peak to peak amplitude is determined by a signal component which is known to be established at a constant level rather than attempting to maintain a constant video signal amplitude in those situations where it is known that such video signal information will be a variable quantity. Such synchronizing circuits are well known in the art and thus not described here. Although only two IF amplifier stages are shown, it will be understood that other amplifier stages may be utilized as desired to provide the proper level of amplification of the video signal before applying it to the operating circuits of the television system.

The system thus far described is common to most commercially available television receivers. In addition, the prior art receivers also include a standard AGC control loop which is connected to the second IF amplifier generally following a pass band stage to provide an output signal which can be used to control the gain of the RF amplifier in the tuner. In the drawing, this second AGC circuit is shown as supplying a signal on a line 22 through a buffer amplifier 24 and an AGC logic circuit 26 and then via the line 28 to the RF amplifier 14. With the exception of the buffer amplifier 24 and the AGC logic circuit 26, this AGC loop is a standard AGC loop commonly used in television receivers and is referred to herein as a tuner AGC loop. The voltage on line 28 affects a biasing circuit located in the RF amplifier 14 and is utilized to reduce the gain of the RF amplifier 14 to prvent overloading of the amplifier upon receipt of very strong signals. The gain of the typical RF amplifier 14 is generally set relatively high in order to effectively process low amplitude video information signals. In practice, the gain reduction of the RF amplifier 14 is generally delayed until after the gain of the IF amplifier has been reduced to substantially minimim levels. This practice assures that the signal to noise ratio in the RF amplifier 14 is normally high enough to permit gain reduction without introducing significant noise problems into the receiver. The point at which RF gain reduction is to begin is emperically determined by the receiver designer and is typically set by an adjustment in the RF amplifier circuit. A typical prior art automatic gain control circuit associated with the television receivers is shown in U.S. Pat. No. 3,457,366. This patent illustrates a keyed AGC system controlling both the gain of the second IF amplifier and the gain of the RF amplifier in the tuner circuit. A circuit design for an AGC regulated RF amplifier is shown in U.S. Pat. No. 4,237,490.

In the present invention, the tuner AGC voltage is based upon the amplitude of the video information signal when the video information signal to noise ratio is adequate. If the signal to noise ratio has not reached a desired level, the tuner AGC voltage is based on the actual ratio of video signal to noise. The system thus adapts to variations in tuner gain and signal conditions to maintain an optimum signal to noise ratio and therefore to produce a better picture on the television receiver. In order to determine the actual noise content of the video signal, the video output signal from the amplifier stage 20 is monitored by a filter circuit 30. The filter circuit 30 provides an output signal proportional to the noise content of the video output signal. In a preferred embodiment, the filter circuit 30 is a band pass filter having a 500 KHz pass band centered at 5.5 MHz. Since the information signal contained in the video output signal has an upper band limit of 4.5 MHz, the output signal from the band pass filter 30 contains only noise. Although the noise is outside the pass band of the video information signal, it has been found that this noise is proportional to the noise contained within the video information pass band.

The noise signal developed at the output terminal of the filter 30 is applied to a high frequency amplifier 32 which buffers the signal before it is then applied to a detector circuit 34. The detector circuit 34 may be a simple diode detector circuit or a more complex AC to DC converter of a type well known in the art. The purpose of the detector circuit 34 is to convert the high frequency noise signal to a direct current (DC) signal. The detector circuit 34 therefore provides a direct current output signal proportional to the amplitude of the noise contained in the video output signal from the amplifier stage 20. The direct current signal developed by the detector 34 is applied to a direct current scaling amplifier 36 which sets the amplitude of that signal in correspondence with the amplitude of the signal developed by the amplifier 24. The output signal developed by the amplifier 36 is referred to as the noise AGC signal.

The AGC logic circuit 26 is designed to select the one of the signals from the amplifier 24 or the amplifier 36 having the largest amplitude and to use that signal as the tuner AGC voltage to control the gain of the RF amplifier 14. In its simplest version, the AGC logic circuit may comprise a diode OR gate having a first diode 38 connected between the output of amplifier 24 and a junction at an input terminal of a buffer amplifier 40 and a second diode 42 connected between an output terminal of the amplifier 36 and the junction at the input terminal of the amplifier 40. Thus, the junction at the input terminal of the amplifier 40 will be driven to the higher of the voltage signals from the amplifier 24 or the amplifier 36. The amplifier 40 merely provides a buffering action and in this regard may be considered as an operational amplifier of a type well known in the art having an output terminal connected to drive the tuner AGC line 28.

It will be appreciated that the system described above provides an AGC system which regulates the gain of the RF amplifier 14 as a function either of the amplitude of the video signal or more particularly, the amplitude of the synch pulses contained in the video signal, or as a function of the signal to noise ratio of the video output signal. Since the video output signal from the amplifier stage 20 is at a constant amplitude due to the control of the IF AGC loop, the amplitude of the noise signal developed on the noise AGC line is thus indicative and proportional to the signal to noise ratio in the video output signal. When the signal to noise ratio is above the desired level, e.g., when a low gain channel is being detected, the tuner gain is controlled by the standard AGC system. Whenever the signal to noise ratio is below the desired level, the noise AGC circuit will take over and control the gain of the RF amplifier 14 as a function of the signal to noise ratio. Obviously, if the input signal to the RF amplifier 14 is so large that the tuner becomes saturated before the desired signal to noise ratio is reached, the standard AGC loop will take over and reduce the gain of the RF amplifier 14. Accordingly, what has been described is a system which operates in a standard AGC mode when the signal to noise ratio is adequate and automatically switches to a signal to noise ratio control mode when the signal to noise ratio is inadequate. Thus the picture generated by the video output signal from the second IF amplifier stage 20 is optimized under a broad range of input signal conditions.

Although the invention has been disclosed in a preferred embodiment, it will be apparent that modifications may be made to the invention for application in similar or diverse types of receivers without departing from the spirit of the invention. The appending claims are therefore intended to cover and embrace any such modifications of the invention, subject only to the true spirit and scope of the claims.

What is claimed is:

1. In a television receiver having a variable gain tuner including an adjustable gain RF amplifier for receiving a video information signal, an IF amplifier connected to an output terminal of the tuner and including a variable gain amplifier with an internal automatic gain control loop for providing a constant amplitude composite video output signal, the composite video signal including video information and noise, an improved automatic gain control system for the tuner comprising:
   first means for monitoring the amplitude of the signal applied to the IF amplifier;
   second means for monitoring the amplitude of the noise component of the composite vodeo signal;
   means for selecting the largest one of the signals monitored by said first and second means; and
   means for coupling said selected signal to the tuner for adjusting the gain thereof to provide improved signal to noise ratio.

2. The system of claim 1 wherein said second means comprises:
   filter means having an input terminal connected to receive the composite video signal, said filter means being effective to pass only a signal representative of the noise component of the composite video signal; and
   means for converting the noise component to a proportional gain control signal.

3. The system of claim 2 wherein said converting means comprises:
   a tuned amplifier having an input terminal connected to an output terminal of the filter means for providing an amplified noise component signal;
   detector means for converting the amplified noise component signal to a proportional DC voltage signal; and
   a buffer amplifier connected to receive the proportional DC voltage signal and for providing the proportional gain control signal.

4. The system of claim 1 wherein said selecting means comprises:
   a logical OR circuit having a first input terminal connected to receive a signal from said first monitoring means and a second input terminal connected to receive the proportional gain control signal, said OR circuit providing an output signal corresponding to the largest of the signals applied to its first and second input terminals; and
   buffer amplifier means connected to receive said output signal of said OR circuit for providing said selected signal.

5. A method of automatically adjusting the gain of a television receiver tuner in response to variations in received signal strength and signal to noise ratio comprising the steps of;
   (a) receiving a modulated radio frequency (RF) signal having a video information signal component and a noise signal component;
   (b) converting the modulated RF signal to an intermediate frequency (IF) signal in a tuner including a variable gain RF amplifier;
   (c) deriving a composite video signal from the IF signal in an amplifier stage including a controllable gain IF amplifier;
   (d) adjusting the amplitude of the composite video signal to a predetermined peak-to-peak value;
   (e) providing an AGC signal representative of the amplitude of the IF signal;
   (f) deriving from the composite video signal a noise signal representative of the noise signal amplitude in said composite signal;
   (g) selecting the one of the AGC signal and the noise signal having the greatest amplitude; and
   (h) using the selected one of the signals to control the gain of the RF amplifier.

6. An AGC system for an electronic signal processor, the processor including a first variable gain amplifying stage for amplifying an information signal to within a predetermined range and a second controllable gain amplifier for converting said information signal to a relatively constant amplitude output signal, the output signal including superimposed variable noise level signals, the system comprising:
   first means for sampling the information signal and for developing a first gain control signal proportional to the amplitude of the information signal;
   second means for sampling the output signal and for developing a second gain control signal proportional to the amplitude of the noise level signals; and
   means for selectively applying one of said first and second gain control signals to said first variable gain amplifying stage, the gain of said first variable gain amplifying stage being controlled by said one of said first and second gain control signals.

* * * * *